(12) United States Patent
Rossmeier et al.

(10) Patent No.: US 10,407,336 B2
(45) Date of Patent: Sep. 10, 2019

(54) METHOD AND APPARATUS FOR CONTINUOUSLY CUTTING GLASS

(71) Applicant: Schott AG, Mainz (DE)

(72) Inventors: Thomas Rossmeier, Bodenheim (DE); Andreas Ortner, Gau-Algesheim (DE); Jürgen Vogt, Oberheimbach (DE); Andreas Habeck, Undenheim (DE); Clemens Ottermann, Hattersheim (DE); Dirk Förtsch, Waldalgesheim (DE); Christian Breitbach, Darmstadt (DE); Stephan Behle, Gau-Odernheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 15/686,514

(22) Filed: Aug. 25, 2017

(65) Prior Publication Data
US 2018/0037490 A1 Feb. 8, 2018

Related U.S. Application Data

(63) Continuation of application No. PCT/EP2016/056611, filed on Mar. 24, 2016.

(30) Foreign Application Priority Data

Mar. 27, 2015 (DE) .................. 10 2015 104 815

(51) Int. Cl.
*C03B 33/00* (2006.01)
*C03B 33/09* (2006.01)
(Continued)

(52) U.S. Cl.
CPC .......... *C03B 33/091* (2013.01); *B65G 49/065* (2013.01); *C03B 33/0235* (2013.01); *C03B 33/03* (2013.01)

(58) Field of Classification Search
CPC ...................................................... C03B 33/00
See application file for complete search history.

(56) References Cited

U.S. PATENT DOCUMENTS 6,079,701 A * 6/2000 Corle ...................... C03B 33/03
225/96.5
2006/0065647 A1 * 3/2006 Kim ................... B23K 26/0736
219/121.69
(Continued)

FOREIGN PATENT DOCUMENTS

JP 2000-233936 A 8/2000
WO 2011/025074 A1 3/2011
(Continued)

OTHER PUBLICATIONS

Notification of Transmittal of Translation of the International Preliminary Report on Patentability dated Oct. 12, 2017 for International Application No. PCT/EP2016/056611 (9 pages).
(Continued)

*Primary Examiner* — Cynthia Szewczyk
(74) *Attorney, Agent, or Firm* — Taylor IP, P.C.

(57) ABSTRACT

A method for cutting a thin glass including the steps of guiding, by a transport device, the thin glass ribbon over a levitation support, and directing, within a range of the levitation support, a laser beam onto the thin glass ribbon, which heats up the thin glass ribbon at an impingement point of the laser beam. The method also includes the step of blowing, by a cooling jet generator, a cooling fluid onto the track heated by the laser beam so that a region heated by the laser beam is cooled down and a mechanical stress is created. The cooling fluid contains vapor of a liquid at a saturation ratio of at least 0.5 or a plurality of liquid droplets. The liquid droplets form a contact angle on a surface of the thin glass ribbon which is smaller than that of water on the same surface.

22 Claims, 8 Drawing Sheets

(51) Int. Cl.
*B65G 49/06* (2006.01)
*C03B 33/023* (2006.01)
*C03B 33/03* (2006.01)

(56) References Cited

U.S. PATENT DOCUMENTS

| | | | |
|---|---|---|---|
| 2007/0169849 A1 | 7/2007 | Yahagi et al. | |
| 2008/0135532 A1* | 6/2008 | Hasaka | B23K 26/0604 219/121.78 |
| 2010/0075580 A1* | 3/2010 | Ostendarp | B28D 1/225 451/259 |
| 2012/0017642 A1 | 1/2012 | Teranishi et al. | |
| 2012/0131962 A1 | 5/2012 | Mitsugi et al. | |
| 2013/0126576 A1 | 5/2013 | Marshall et al. | |
| 2013/0266757 A1* | 10/2013 | Giron | C03B 33/0222 428/98 |
| 2014/0113797 A1 | 4/2014 | Yamada et al. | |
| 2015/0209898 A1* | 7/2015 | Kim | B23K 26/08 65/112 |
| 2015/0232369 A1* | 8/2015 | Marjanovic | C03B 33/0222 428/192 |
| 2015/0299019 A1 | 10/2015 | Fuji et al. | |
| 2015/0315059 A1 | 11/2015 | Abramov et al. | |
| 2016/0023448 A1* | 1/2016 | Bookbinder | B32B 17/064 156/250 |
| 2016/0280579 A1* | 9/2016 | Yamamoto | B28D 1/222 |

FOREIGN PATENT DOCUMENTS

| | | | |
|---|---|---|---|
| WO | 2011/026074 A1 | 3/2011 | |
| WO | 2012/141874 A1 | 10/2012 | |
| WO | WO-2014085357 A1 * | 6/2014 | B65G 49/065 |
| WO | 2014/103624 A1 | 7/2014 | |
| WO | 2014/175147 A1 | 10/2014 | |

OTHER PUBLICATIONS

Notice of Transmission of the International Research Report and the Written Notice Issued the International Searching Authority or Declaration dated Jun. 15, 2016 for International Patent Application No. PCT/EP2016/056611 (15 pages).

* cited by examiner

METHOD AND APPARATUS FOR CONTINUOUSLY CUTTING GLASS

CROSS REFERENCE TO RELATED APPLICATIONS

This is a continuation of PCT application No. PCT/EP2016/056611, entitled "METHOD AND APPARATUS FOR CONTINUOUSLY CUTTING GLASS", filed Mar. 24, 2016, which is incorporated herein by reference.

BACKGROUND OF THE INVENTION

1. Field of the Invention

The present invention generally relates to the cutting of glass, and more particularly, to the separation of bead portions of a glass ribbon.

2. Description of the Related Art

A common method of cutting glass is score and break separation. For this purpose, a linear defect zone is introduced mechanically into the glass, typically by using a scoring wheel. Then, the glass can be easily separated along this defect zone by applying a mechanical stress. A drawback thereof, however, is that the glass edge of a glass element obtained in this way may still exhibit defects of the previously produced defect zone. Since especially the edges are particularly critical in view of mechanical loading of the glass in the form of tensile stresses, the cutting of a glass by score and break separation may cause a considerable reduction in strength, in particular under bending stress.

Sheet glasses, in particular thin and ultra-thin glasses with thicknesses of less than 200 micrometers are nowadays commonly produced in the form of long ribbons. As a result of the production process, for example when redrawing a glass ribbon from a preform or drawing from a molten glass, thickened edge portions, so-called beads, are typically being formed along the edge of the glass ribbon. Favorably, these beads are separated once the glass ribbon has been produced, in order to facilitate the winding onto a roll in the case of thin glasses or, more generally, the further processing, among other things. Problems such as the arising of mechanical stresses caused by the thicker bead portions and entailing twisting or warping of the thin glass can be avoided in this way.

An apparatus and a method for continuous edge separation for a thin glass ribbon are known from US 2013/0126576 A1. With this apparatus, initial damage is introduced into the glass ribbon using a scoring device. The scoring device is configured as a roller including an abrasive medium, which creates defects perpendicularly to the longitudinal extension direction of the glass ribbon. While the glass ribbon is guided along its longitudinal extension direction over a curved levitation support, it is heated by a laser beam and cooled down by a fluid so as to induce thermal stresses within the glass ribbon. This causes the glass ribbon to break along its longitudinal extension direction starting from an initial defect. One drawback hereof, among others, is that the initial damage partially also extends into the quality portion of the glass ribbon, so that defects at the edge side may remain in the trimmed thin glass ribbon.

WO 2011/026074 A1 describes a method for forming a vent in a glass substrate. In this method, a laser beam is directed onto a defect and advanced over the glass surface. Additionally, a fluid jet is directed directly onto the laser spot on the glass surface such that the glass is cooled even before the temperature generated by the laser beam has been fully equilibrated across the thickness of the glass substrate. As a result, the thermal stress is limited to part of the thickness of the glass substrate, and the resulting vent only extends partially through the thickness of the glass substrate.

Both with the apparatus and method of US 2013/0126576 A1 and with the method of WO 2011/025074, the location at which the thermal stresses are produced for separating the glass is determined by the location of contact of the fluid on the glass surface. A drawback of the apparatus and the methods of the two cited documents is that this location of contact of the fluid may differ from the location on the glass surface onto which the fluid jet is directed. The reason for this is possible uncontrolled spreading of the fluid on the glass surface after the impact of the fluid jet. However, precise controlling of the location of contact of the fluid is generally advantageous for processing thin glass ribbons, in particular in order to ensure consistent edge quality and strength.

What is needed in the art is a method and apparatus for precisely controlling the contact location of the cooling fluid for processing thin glass ribbons.

SUMMARY OF THE INVENTION

The present invention provides an apparatus and method to process a thin glass having a thickness of less than 400 µm, for example less than 200 µm, in particular by separating bead portions of the glass ribbon such as to provide improved edge quality and strength.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
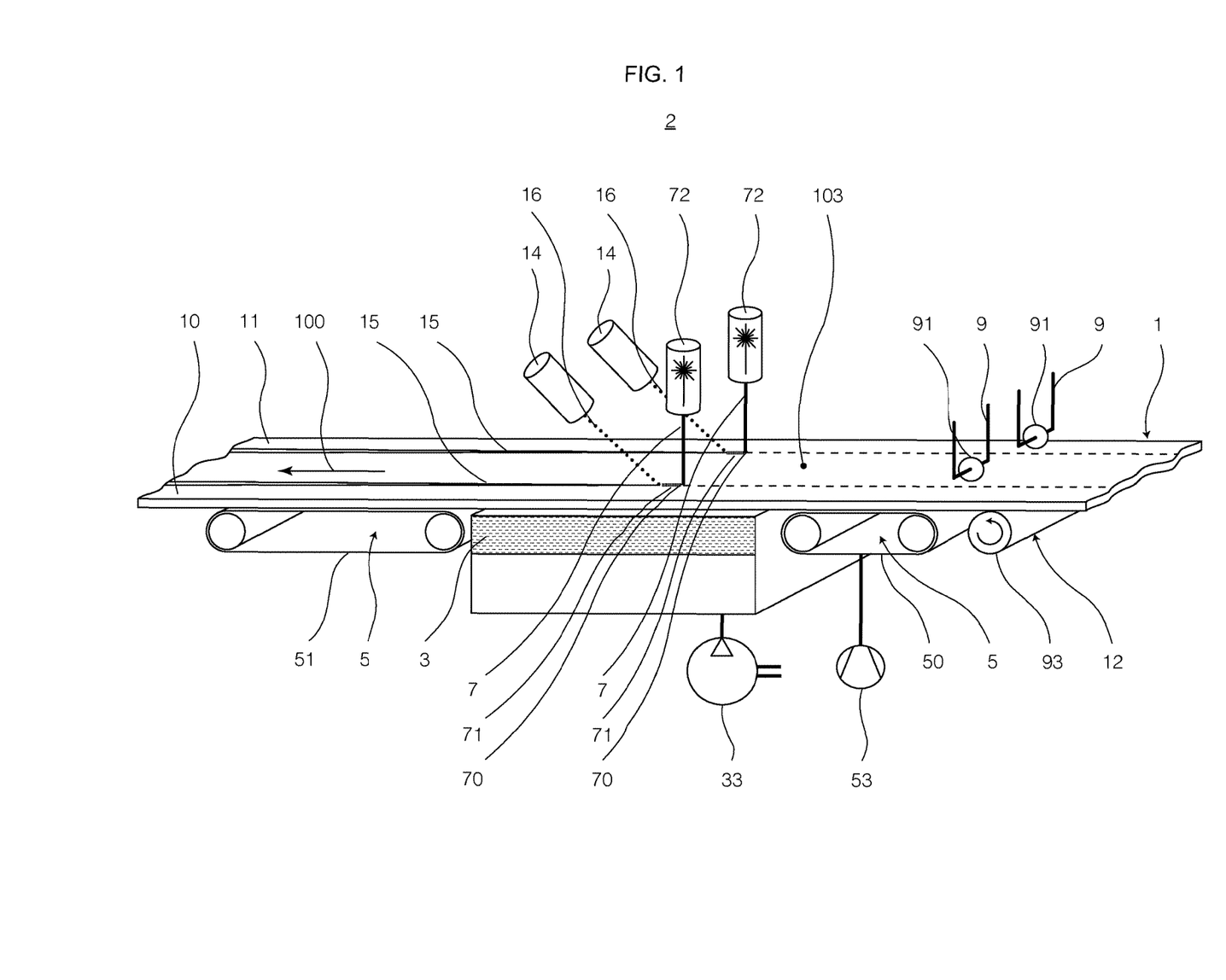
FIG. 1 is a schematic view of an apparatus for continuously cutting glass.

FIG. 1 shows an embodiment of an apparatus 2 for cutting a thin glass ribbon 1 along its longitudinal extension direction 100, in the present case for severing edge portions, in particular beads 10, 11 from a thin glass ribbon 1. The method which can be performed using the apparatus 2 for cutting a thin glass ribbon 1 along the longitudinal extension direction 100 thereof, in the present case for severing edge portions, in particular beads 10, 11 from a thin glass ribbon 1 is performed on the basis that a thin glass ribbon 1 having a thickness of approximately 400 µm is guided, by a transport device 5, along its longitudinal extension direction 100 over a levitation support 3, while a laser beam 7 is directed onto the thin glass ribbon 100 within the range of the levitation support. The laser beam heats the thin glass ribbon 1 at the impingement point 70 of the laser beam 7 while the thin glass ribbon 1 is advanced below the beam in the longitudinal direction 100, so that the laser beam 7 draws a track 71 running in the longitudinal extension direction 100 of the thin glass ribbon 1. By way of a cooling jet generator 14, a cooling fluid is blown onto the track 71 heated by the laser beam 7 so that the region heated by the laser beam 7 is cooled down and a mechanical stress is created which causes propagation of a stress crack 15 separating the glass ribbon 1 in the longitudinal extension direction 100 along the track 71 of the laser beam 7.

Figure 5:
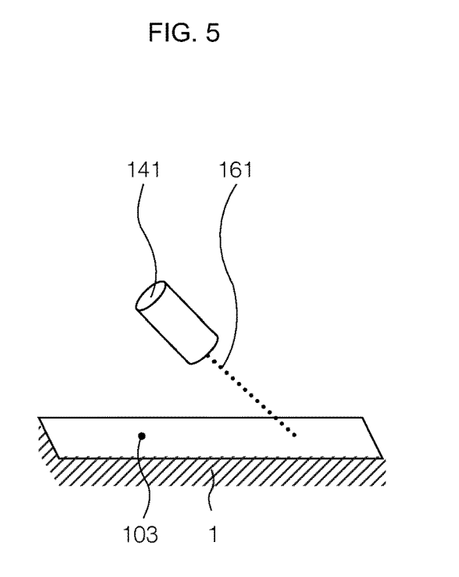
FIG. 5 shows an aerosol generator.
Figure 6:
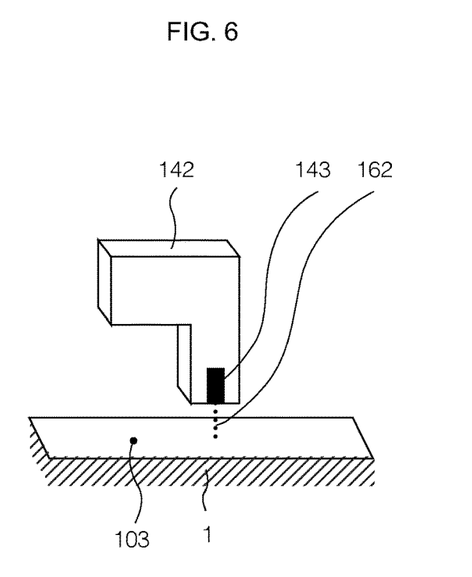
FIG. 6 shows an ink-jet printing head.

It is contemplated that the cooling fluid contains vapor of a liquid at a saturation ratio of at least 0.5, or contains liquid droplets, which liquid droplets form a contact angle on the surface of the thin glass ribbon 1 which may be smaller than that of water on the same surface. For example, air with a relative air humidity of at least 50 percent can be used as the cooling fluid, or an aerosol, or separated liquid droplets. As shown in FIG. 5, the cooling jet generator 14 is configured as an aerosol generator 141, if an aerosol is used as a cooling fluid. As shown in FIG. 6, the cooling jet generator 14 may as well be configured as an ink-jet printing head 142 with a nozzle 143 that ejects isolated liquid droplets. The cooling fluid is sprayed, by a cooling jet generator 14, onto the respective separation point previously heated by the laser beam 7, in the form of a cooling jet 16, and the cooling jet 16 contains vapor of a liquid at a saturation ratio of at least 0.5, or liquid droplets. If the cooling fluid contains vapor of a liquid, i.e. a gaseous phase of a vaporized liquid, this may be an air jet with a relative air humidity of at least 50 percent. If an aerosol is employed, the cooling jet 16 will be an aerosol jet 161, if isolated liquid droplets are employed, the cooling jet will be a jet of droplets 162.

A cooling fluid containing vapor or liquid droplets can be suggested because high cooling performance can be achieved with the gaseous or liquid phase of the cooling fluid, which in turn can cause a high thermal stress, that means a high stress difference in the glass.

Figure 4:
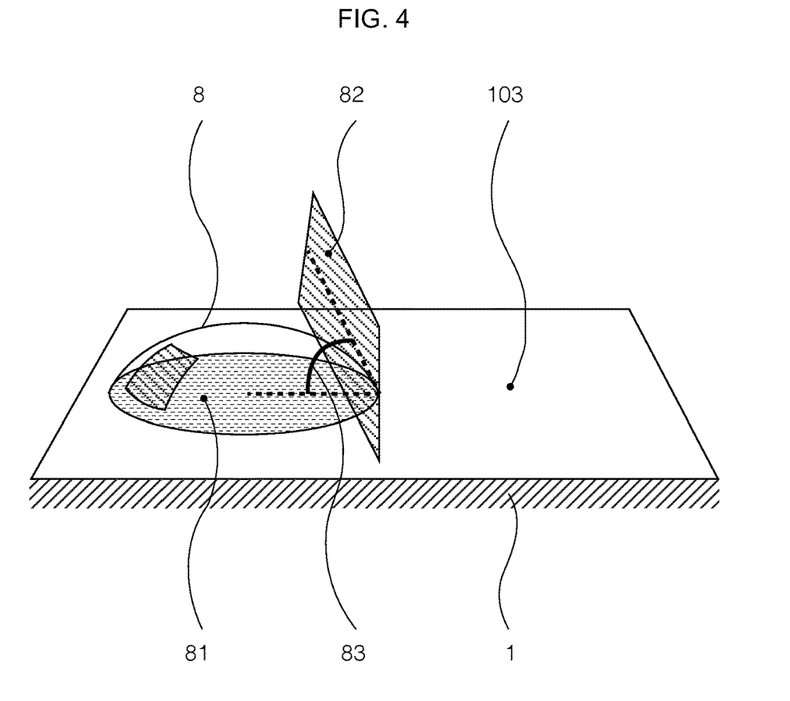
FIG. 4 shows a liquid droplet on the surface of the thin glass ribbon.

As shown in FIG. 4, the liquid droplets optionally contained in the cooling fluid will wet the thin glass surface 103 as soon as they come into contact with the latter. In some cases, the vapor optionally contained in the cooling fluid can also wet the thin glass surface 103 when this gaseous phase condenses upon contact. The contact angle 83, also referred to as wetting angle, is the angle which forms between the contact surface 81 of a liquid droplet 8 located on the surface 103 of the thin glass and a tangential surface 82 to the droplet surface due to the triple point. This definition of the contact angle 83 means that the contact angle 83 can generally assume values between 0 and 180 degrees, depending on the surface energies of the involved substances, and the wetting of the thin glass surface by the droplet will be the stronger the smaller the contact angle is. Accordingly, the greater the contact angle, the lower the wetting. The property of the liquid droplets contained in the cooling fluid to form a contact angle 83 with the surface 103 of the thin glass ribbon 1 which is smaller than that of water on the same surface therefore means that the liquid droplets may wet the thin glass surface 103 strongly.

An advantage of a high wettability of the liquid droplets on the thin glass surface 103 is controlled spreading of the cooling fluid on the thin glass surface 103 following the impact of the cooling jet 16. What is achieved with the high wettability of the liquid droplets is that the location of impact of the cooling jet 16 on the thin glass surface 103 coincides the best possible with the location of contact of the cooling fluid itself. In this manner it is possible to precisely define the location of contact of the cooling fluid by the location of impact of the cooling jet 16, since by virtue of the high wetting the droplets will adhere to the glass surface immediately after their impact. The possibility of being able to define precisely the location of contact of the cooling fluid, for example by the cooling jet 16, is advantageous since it is this same location at which the thermal stresses are produced due to which the glass can be separated. In addition, by virtue of the high wetting capacity of the liquid droplets and the resulting large contact area 81 with the thin glass surface 103, high cooling performance of the cooling fluid is achieved.

According to another embodiment of the invention, water vapor is provided as the vapor of a liquid contained in the cooling fluid. If the cooling fluid is air, the saturation ratio of the cooling fluid is the relative air humidity. In this case, relative air humidity is at least 70 percent, for example at least 80 percent, and for example at least 90 percent.

A cooling fluid in the form of humid air can be produced, for example, by having dry air discharged from a source of compressed air into water and allowing it to rise therein. The air moistened in this way can then be fed to the cooling jet generator 14.

The volume flow, i.e. the quantity of cooling fluid per unit time which is sprayed by the cooling jet generator 14 onto the point of separation previously heated by the laser beam 7 should not be chosen too low, since otherwise the separation process might start poorly, become unstable, or could break down. On the other hand, the volume flow should not be chosen too high, since otherwise thermal or mechanical formation of waves could be caused in the glass. The volume flow can in particular be a function of the glass thickness of the thin glass ribbon 1. Surprisingly, it has been found that with increasing glass thickness, a smaller quantity of cooling air per unit time can be sufficient.

It has been found to be advantageous to choose the cooling jet flow, i.e. the volume flow of the cooling fluid, as a function of the thickness of the glass. A higher cooling jet flow in case of a thinner glass may be chosen. Thus, upon a process change from a thicker glass to a thinner glass, the cooling jet flow is increased, and vice versa. In particular, the flow can be adjusted proportionally to the glass thickness. For example, with a glass thickness of 50 µm, a flow that is about twice the flow which is particularly suitable for a glass of 100 µm thickness has been found favorable. Generally, very low flows are already sufficient, and in case of a glass thickness of 100 µm the optimal cooling jet flow approaches zero. However, some cooling jet flow is always favorable. Completely without a cooling jet, the cutting process could become unstable or might start poorly, and processing might be interrupted because the crack does not continue propagating. On the other hand, an excessive flow might cause thermal or mechanical formation of waves in the glass.

Without being limited to the present embodiments, the cooling jet flow, i.e. the volume flow of the cooling fluid, can be between 0.001 l/h (liters per hour) and 1.0 l/h. For glass thicknesses between 75 μm and 400 μm, e.g. for a glass thickness of 100 μm (e.g. plus/minus 10 μm), a volume flow of between 0.001 l/h and 0.3 l/h, for example 0.05 l/h (in particular plus/minus 0.01 l/h) may be favorable. For glass thicknesses between 5 μm and 75 μm, e.g. for a glass thickness of 50 μm (in particular plus/minus 10 μm), a volume flow of between 0.06 l/h and 1.0 l/h, for example 0.4 l/h (in particular plus/minus 0.1 l/h) may be favorable.

According to one embodiment of the invention, water droplets including surfactant are suitable as liquid droplets of the cooling fluid. The surfactant lowers the surface tension of the water and increases wetting. According to an alternative or additional embodiment, the liquid droplets may contain a monohydric or polyhydric alcohol. Alcohols generally also have a lower surface tension than water. The alcohol(s) may also be used in a mixture with water. Another suitable component of the liquid droplets is ethylene glycol, inter alia, which not only has a surface tension that is lower than that of water, moreover, ethylene glycol has a higher boiling point.

A cooling fluid may be sprayed onto the glass surface, whose liquid droplets have a contact angle of less than 40° on the glass surface, for example less than 20°.

Besides a small contact angle, a high boiling point of the liquid phase may also be favorable. In this regard, ethylene glycol as a divalent alcohol may be suitable as a component of the liquid droplets. Ethylene glycol can be mixed with water in any mixing ratio. Not only is the surface tension of ethylene glycol lower than that of water, moreover ethylene glycol has a higher boiling point (197° C.). By increasing the boiling point it is possible to shift to higher temperatures the temperature point at which a decrease in cooling performance due to the Leidenfrost effect takes place.

In another embodiment of the invention, a damage or initial defect is introduced by a scoring device 9 at a leading end of the thin glass ribbon 1 prior to the impingement of the laser beam 7, which defect intersects the point of impingement 70 of the laser beam 7 so as to initiate the stress crack.

After the initiation of the stress crack, during crack propagation, the scoring device 9 is then removed from the surface of the thin glass ribbon 1, so that the damaging is terminated. Therefore, the respective apparatus 2 includes a device for removing the scoring device 9 from the surface of the thin glass ribbon 1 during crack propagation, once the stress crack has been initiated. Unlike contemplated in US 2013/0126576 A1, scoring may only be performed initially. It has been found that crack propagation, once initiated, can occur solely by virtue of the temperature gradient caused by the heating with the laser beam 7 and the subsequent cooling with the cooling fluid.

A possible scoring device 9 used is a scoring wheel 91, for example a scoring wheel with a structured scoring or contact surface. FIG. 1 shows the thin glass ribbon after the introduction of the initial defect in the form of a score. Accordingly, the scoring wheels 91 are raised here and do no longer contact the glass surface. Accordingly, at the illustrated moment stress cracking occurs solely by crack propagation, with the stress crack 15 propagating along the advancement direction of the thin glass ribbon 1 and typically starts in the region of impact of the cooling fluid. Thus, the cutting wheel is brought into contact with the glass surface for a short time and forms an initial defect in the form of a score in the glass ribbon, while the further crack formation and crack propagation is caused by the temperature gradient generated by the heating with the laser and the subsequent cooling by the cooling fluid. In order to ensure that the score is introduced in defined manner, the glass ribbon is supported by a roller 93 as a counter support 12 on the side facing away from the wheel. Other devices may also be used as counter supports 12. It is also possible, for example, to arrange the scoring device above the levitation support 3. In this case, the levitation support 3 then defines the counter support. The contact force of the scoring wheel 91 is for example less than 4 N, for example less than 1.5 N.

The method of the invention may be suitable for severing very long edge portions or beads, accordingly in particular for trimming the edges of long glass ribbons. In particular, it is contemplated according to another embodiment of the invention that the glass ribbon 1 has a length of at least 10 meters, for example in a range from 10 to 1000 meters, and that edge portions are severed along the longitudinal extension direction 100 of the thin glass ribbon 1.

A compressed fluid, for example air, is supplied to the levitation support 3 by a pressure source, such as a pump 33. The compressed fluid escapes through openings in the surface of the levitation support facing the thin glass ribbon 1, so that a gas cushion is formed between thin glass ribbon 1 and the surface of levitation support 3, which carries and supports the thin glass ribbon 1. Instead of a pump 33, a reservoir with compressed fluid is conceivable, for example. Furthermore, it is possible to connect a reservoir and/or a throttle between the pump 33 and the levitation support 3 in order to provide a consistent output pressure. Thus, in the vicinity of the cutting process the thin glass ribbon 1 is transported in floating manner, by gas levitation, so that on the one hand the ambient air is effective as a thermal isolator, and on the other hand the entire Rayleigh length of the laser focus can be used as a cutting range. The volume flow of the levitation transport may be adjusted as a function of glass thickness and the resultant weight force, through the pressure of the compressed fluid, in order to adjust an optimum position of the ribbon within the working volume of the lasers 72. According to one embodiment, the pressure of the fluid supplied to the levitation support is in a range from 0.1 to 4 bar, for example in a range from 0.1 to 2 bar, for example in a range from 0.2 to 1.0 bar, and for the preferred glass thicknesses of the thin glass ribbon 1 of less than 400 μm, for example less than 200 μm.

According to one embodiment, the transport device 5 includes one or more conveyor belts 50, 51, as illustrated in FIG. 1. In this case, according to one implementation of the invention, the transport device 5 exerts a tensile stress on the thin glass ribbon 1, which is effective at least within the range of the levitation support 3, the tensile stress being effective in the longitudinal extension direction 100 of the thin glass ribbon. Thus, the glass ribbon 1 is held under tensile stress during the transport process. This is advantageous in order to avoid undefined transport conditions such as local deformations or level deviations during the levitation transport, inter alia. For this purpose, a tensile stress is applied to the ribbon by the individual transport units, upstream and downstream of the laser cutting process, the tensile stress increasing from unit to unit.

The transport units of transport device 5 may include one or more conveyor belts. In the example of FIG. 1, two conveyor belts are provided, including conveyor belt 50 arranged upstream of levitation support 3 and conveyor belt 51 arranged downstream of levitation support 3, as seen in the transport direction. A conveyor belt which is arranged upstream of levitation support 3 as seen in the transport direction (i.e. conveyor belt 50 in the example of FIG. 1), may have vacuum suction device 53 for suctioning the thin glass ribbon to the conveyor belt. For example, the vacuum suction device may be in the form of any desired vacuum. This allows to apply sufficiently high tensile forces, while avoiding that the latter interfere with upstream processing steps such as, for example, with a drawing process from a molten glass or from a preform, or else with an unwinding process of the thin glass ribbon from a roll.

More generally, without being limited to the specific exemplary embodiment of FIG. 1, it is possible for the stress crack separation according to the invention if the tensile stress exerted on the thin glass ribbon 1 along the longitudinal extension direction thereof within the range of the levitation support 3 is approximately 10 MPa. Furthermore, a tensile stress of at least 0.5 MPa is possible, in order to be able to appropriately fix the thin glass ribbon 1 in its intended vertical position. A tensile stress along the longitudinal extension direction 100 may be in a range from 0.8 MPa to 3.5 MPa. According to one exemplary embodiment, a tensile stress of 2 MPa is exerted within the range of the levitation support 3, here in the region of impact of the cooling fluid.

Figure 2:
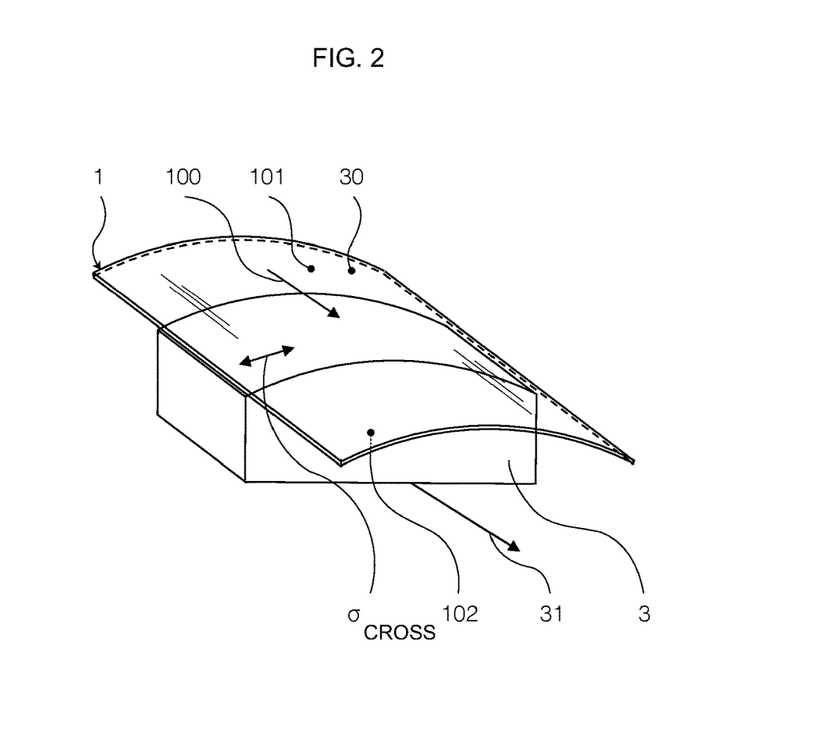
FIG. 2 is a perspective view of a curved levitation support 3 with a thin glass ribbon guided thereover.
Figure 3:
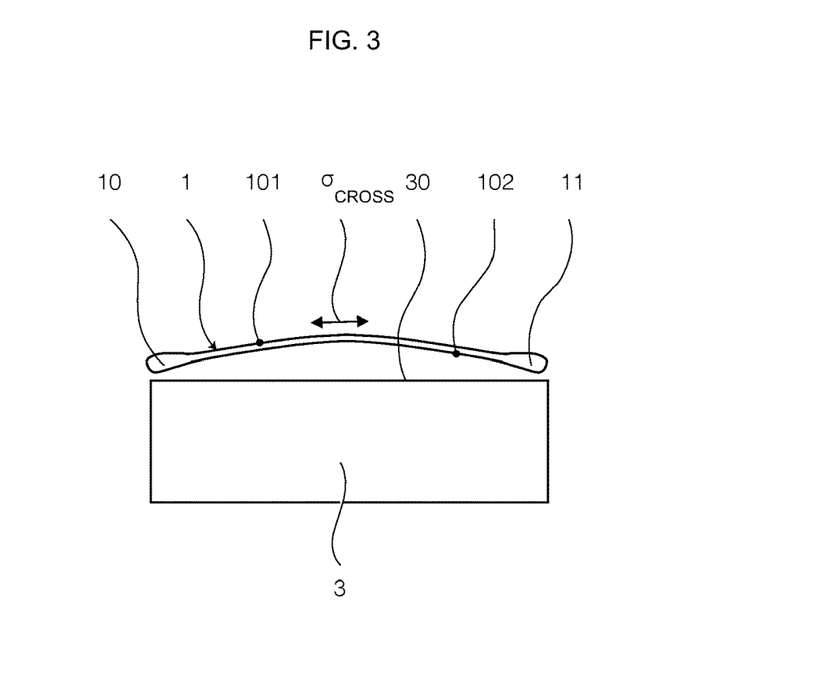
FIG. 3 shows a levitation support having a planar surface and a thin glass ribbon supported thereon as seen in the longitudinal extension direction of the thin glass ribbon.

As an alternative to the embodiment shown in FIG. 1, the levitation support can as well have a flat surface 30 or a surface 30 with a curvature axis 31 with a component along the longitudinal extension direction 100 of the thin glass ribbon 1, parallel to the longitudinal extension direction 100. In particular a convexly curved surface as shown in FIG. 2 is possible in this case. Such a levitation support 3 which has a curvature axis along the longitudinal extension direction 100 of thin glass ribbon 1 is shown in the perspective view of FIG. 2. The levitation support 30 with a flat or convexly curved surface with a curvature axis in parallel to the longitudinal extension direction causes a curvature of the thin glass ribbon with an axis of curvature that is also aligned along the longitudinal extension direction 100 of the thin glass ribbon. In the case of a flat surface, the bulging of the thin glass results from the profile of the pressure field. At the opposite edges with the beads to be severed, the pressure caused by the escaping gas is lower, so that the spacing to the levitation support 3 is smaller there. For this case, FIG. 3 schematically shows the levitation support 3 with the thin glass ribbon 1 supported thereon as seen along the longitudinal extension direction 100 of the thin glass ribbon. Thickened bead portions 10, 11 are located closer to the surface 30, whereas the central portion of the thin glass ribbon 1 bulges. In both embodiments of FIG. 2 and FIG. 3, a curvature of the thin glass ribbon 1 is therefore resulting, with a curvature axis that is aligned along the longitudinal extension direction 100 of the thin glass ribbon 1. This causes a difference in mechanical stress between the upper surface 101 and the lower surface 102 of thin glass ribbon 1. A tensile stress $\sigma_{cross}$ may be produced at the upper surface 101 of thin glass ribbon 1, in a direction transversely, perpendicularly to the longitudinal extension direction 100 of the ribbon. For the purposes of the invention, upper surface 101 herein refers to the side of the thin glass ribbon 1 facing away from levitation support 3, and lower surface 102 refers to the side of the thin glass ribbon 1 facing levitation support 3. For illustration purposes, the direction of tensile stress $\sigma_{cross}$ is indicated in FIGS. 2 and 3. A tensile stress may be applied within the range of levitation support 3, that is to say where the beads 10, 11 are separated by stress crack separation, in order to promote crack propagation even if the curvature and therefore the resulting tensile stress is only small. The tensile stress transversely to the longitudinal extension direction causes a crack-expanding force acting on the crack.

On the other hand, other than in the arrangement known from US 2013/0126576 A1, stress differences in the longitudinal direction are only small. Although it is preferred to apply a tensile force that is effective in the longitudinal direction, as mentioned above, this force has the same effect on the upper surface 101 and on the lower surface 102 of the thin glass ribbon 1. According to another embodiment of the invention it is therefore contemplated that the thin glass ribbon 1 is guided such that a difference between mechanical stresses acting on the upper surface 101 and on the lower surface 102 in the longitudinal extension direction 100 of the ribbon is less than 0.25 MPa within the range of levitation support 3.

Furthermore, it is possible that with a tensile force exerted on the thin glass ribbon along the longitudinal extension direction thereof within the range of levitation support 3, a ratio $\Delta\sigma/\sigma$ is less than 0.5, wherein $\Delta\sigma$ is the difference of the tensile stresses acting in the longitudinal direction on the upper surface 101 and on the lower surface 102, and $\sigma$ is the tensile stress produced by the applied tensile force in the longitudinal direction. For example, the ratio $\Delta\sigma/\sigma$ is less than 0.125.

The tensile stress caused at one of the ends of the thin glass ribbon 1 by the guidance of the thin glass ribbon 1 according to the invention above the levitation support 3 is moreover particularly suitable for severing the beads in glasses having a low coefficient of thermal expansion. The tensile stresses thermally induced by the laser and the cooling fluid will be lower in this case, according to the smaller coefficient of expansion. This is in particular true for glasses having a coefficient of linear thermal expansion of $\alpha<4*10^{-6}$ K$^{-1}$. Such glasses include alkali-free borosilicate glasses, for example, which have a coefficient of linear thermal expansion of less than $3.5*10^{-6}$ K$^{-1}$. In this case, by virtue of the bulging of the thin glass ribbon 1, a tensile stress perpendicular to the longitudinal extension direction 100 may be exerted within the range of the levitation support 3, for example at the point of impingement 70 of the laser beam 7, so that a ratio $\sigma/\alpha$ of tensile stress $\sigma$ to coefficient of linear thermal expansion $\alpha$ is at least $0.07*10^{-6}$ MPa/K.

With the temperature difference produced due to the heating by the laser and subsequent cooling by the cooling jet, the mechanical stress will be $$\sigma = \tfrac{1}{2} CTE \cdot E \cdot \Delta T. \tag{1}$$

In this equation, the factor CTE denotes the coefficient of linear thermal expansion, E denotes the Young's modulus of the glass, and $\Delta T$ the generated temperature difference. This stress will then lead to a propagation of the crack if it is greater than the minimum breaking stress $$\sigma_{min} = \frac{K_{Ic}}{2\sqrt{a}}. \tag{2}$$

In this expression, the parameter $K_{Ic}$ denotes the fracture toughness and the parameter denotes the critical crack length. The critical crack length corresponds to half the crack width c. Fracture toughness $K_{Ic}$ is also referred to as a critical stress intensity factor. Particularly advantageous cutting properties are resulting for a stress of $$\sigma \geq \frac{7}{5}\sigma_{min}. \quad (3)$$

Thus, when combining equations (1) to (3), according to one embodiment of the invention, a temperature difference is produced by the laser and the cooling jet, which has at least the value of $$\Delta T = \frac{7}{5} \cdot \frac{K_{Ic}}{\sqrt{a} \cdot CTE \cdot E}. \quad (4)$$

The apparatus 2 may comprise a control device controlling the control and feed-back control processes of the method according to the invention. The control device may, for example, control the contact pressure of the scoring device and/or the removal or lifting of the scoring device. Further examples include a power control for the laser, flow control for cooling jet generators 14, pressure control for the levitation support 3, adjustment of a tensile force acting on the thin glass ribbon 1 along the longitudinal extension direction thereof.

A laser that is suitable as the laser 72 for producing a laser beam 7 is a $CO_2$ laser, for example. In the example shown in FIG. 1, two lasers 72 are provided for heating the separation lines for separating beads 10, 11 at both edges of the thin glass ribbon 1. Possible laser output powers are in a range of up to 200 W, without being restricted to a specific type of laser.

With the advancing by transport device 5, the initially pre-damaged surface area of the thin glass ribbon 1 is brought into the focus 71 of the laser, such as a $CO_2$ laser, and is heated there by the input of laser energy to a temperature $T<T_g$, and is then rapidly cooled down by an aerosol sprayed thereto by an aerosol generator 141. According to one embodiment, the aerosol generator 141 and hence the aerosol jet 161 emitted therefrom are inclined at an angle in a range from −20° to +20° relative to the surface normal of the thin glass ribbon, or correspondingly also relative to the normal of the surface of levitation support 3. According to one exemplary embodiment, the aerosol generator 141 is inclined at an angle of 7° relative to the surface normal of the glass ribbon. For example an inclination is possible, under which the aerosol jet 161 has a velocity component antiparallel to the transport direction.

By using a cooling fluid which contains liquid droplets, it is possible to very quickly cool down the glass heated by the laser beam 7. In this case, if the spacing between the laser spot and the cooling jet generator 14, or more precisely the spacing between the point of incidence 70 of the laser beam 7 and the point of impact of the cooling jet 16 may be chosen so that the entire volume in the thickness direction of the glass ribbon was heated by heat conduction.

Once the beads 10,11 have been severed by the laser-supported stress crack propagation according to the invention, beads 10, 11 will initially further advance next to the thin glass ribbon 1, and will subsequently be finally separated from the thin glass ribbon 1 by breaking rollers to be fed to a cullet bin. The breaking rollers may be designed so as to be raised at two opposing positions in order to ensure progressive opening of the crack by excessive mechanical stress.

In the processing of long thin glass ribbons it has generally been found, irrespectively of the nature of the severing process, that the guidance of the ribbon may be problematic, since the ribbon only exhibits low stiffness. As a result, the ribbon may deviate laterally, or the ribbon may be subject of undulated deformations. Such effects can interfere with the cutting process and lead to inaccuracies in the dimensions of the ribbon.

Figure 7:
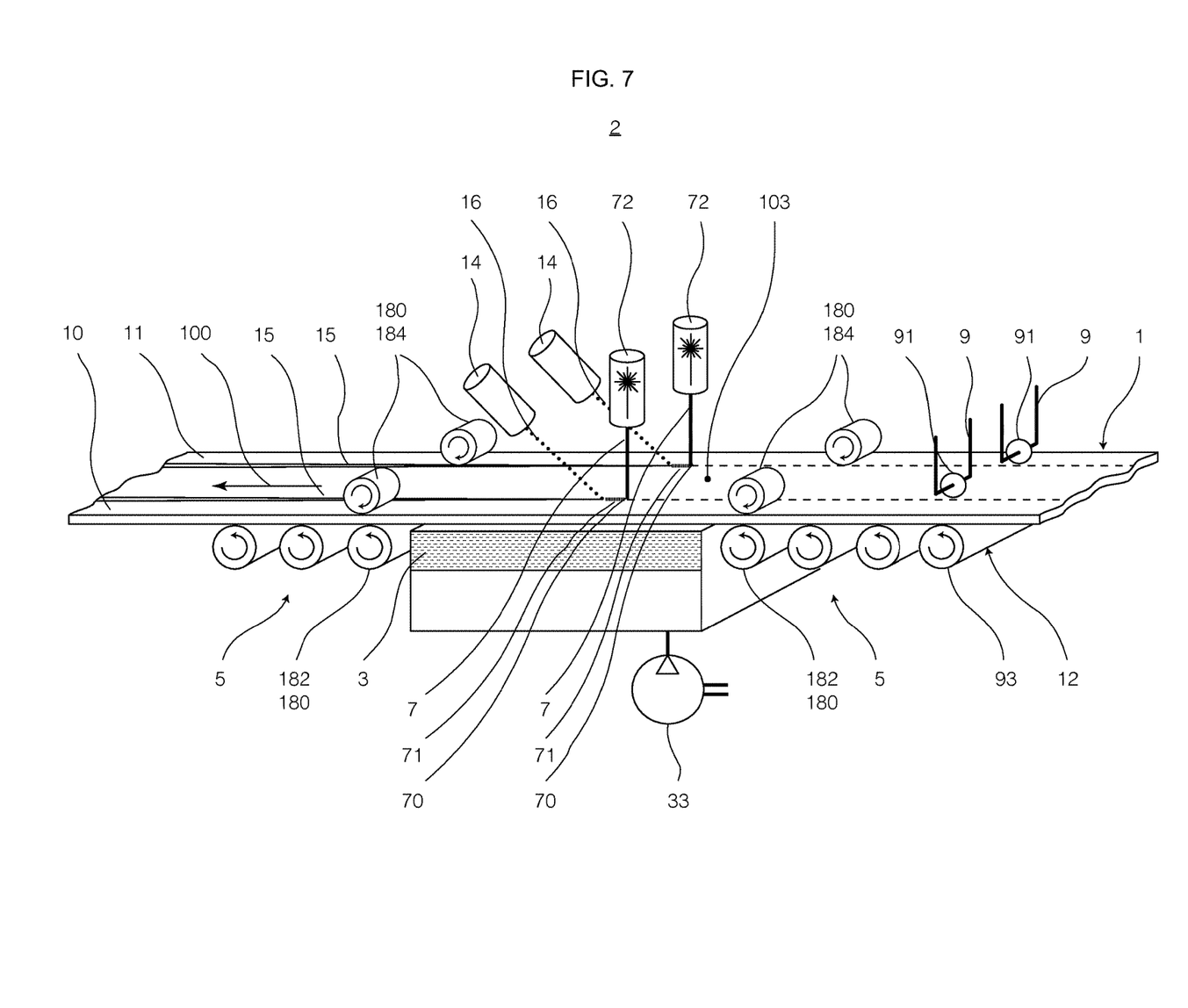
FIG. 7 is a schematic view of another embodiment of an apparatus for continuously cutting glass.
Figure 8:
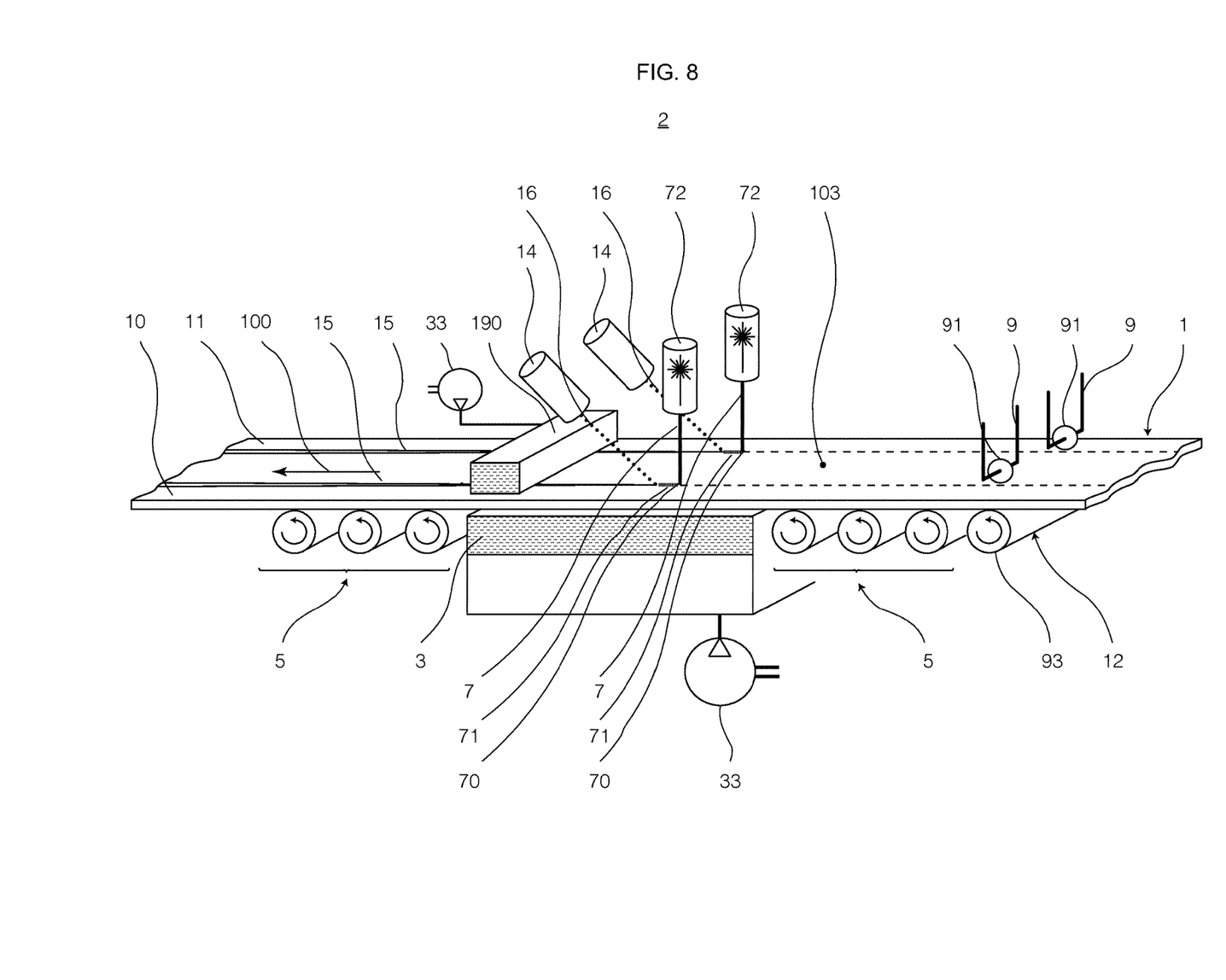
FIG. 8 is a schematic view of another embodiment of an apparatus for continuously cutting glass.
Figure 9:
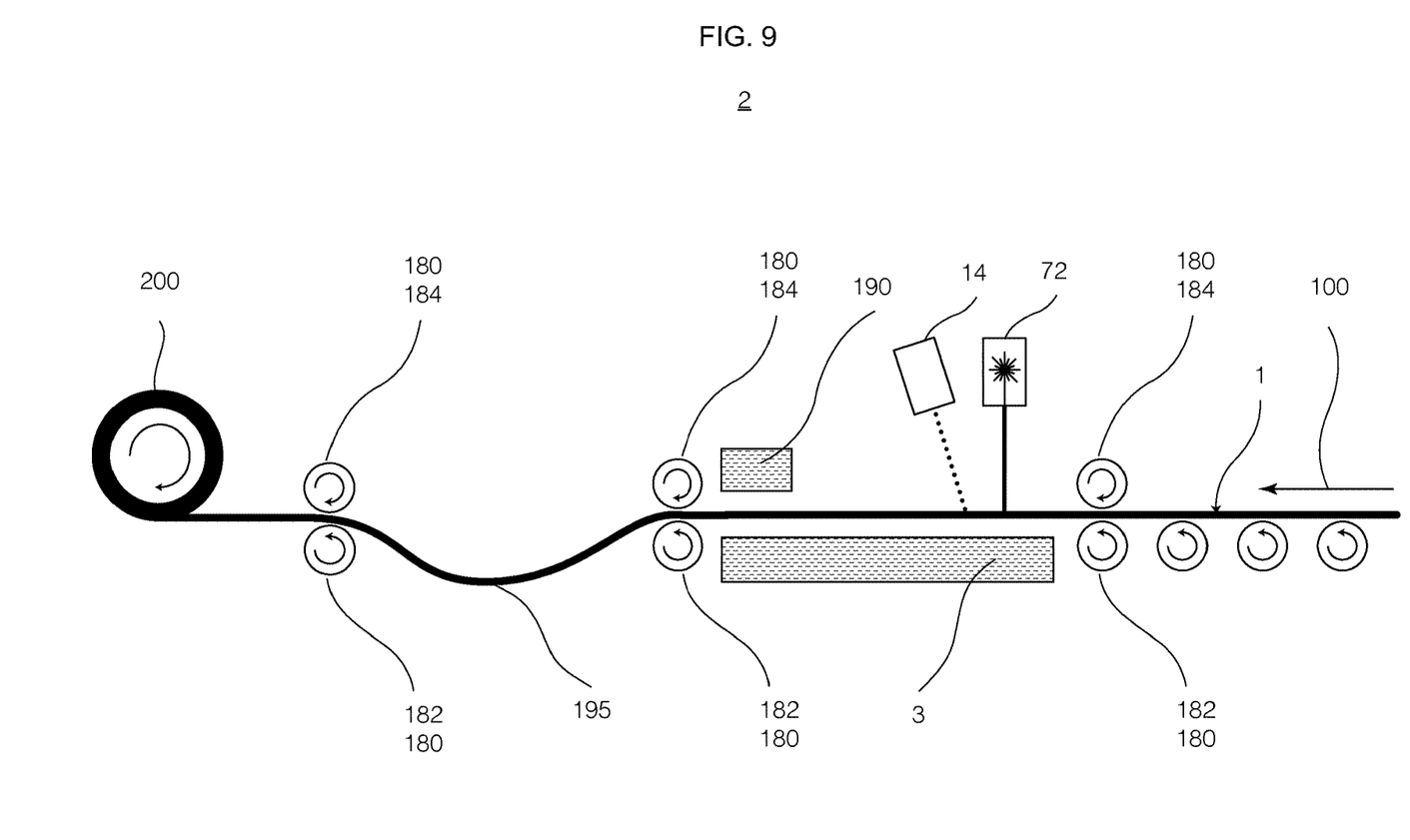
FIG. 9 is a schematic side view of another embodiment of an apparatus for continuously cutting glass.

The embodiments exemplified in FIGS. 7 to 9 can be provided and employed to solve the aforementioned problems, regardless of whether a cooling fluid is provided or which components or phases are included in the cooling fluid.

FIG. 7 shows an example of an apparatus 2 for cutting a thin glass ribbon 1 along its longitudinal extension direction 100, in the present case for severing edge portions, for example beads 10, 11, from a thin glass ribbon 1. The method which can be performed with the apparatus 2 for cutting a thin glass ribbon 1 along its longitudinal extension direction 100, in the present case for severing edge portions, such as beads 10, 11 from a thin glass ribbon 1 is generally performed, without being limited to the use of a cooling jet, on the basis that a thin glass ribbon 1 having a thickness of at most 400 μm is guided by a transport device 5 along its longitudinal extension direction 100 over a levitation support 3. A laser beam 7 is directed onto the thin glass ribbon 100 within the range of the levitation support, which laser beam heats up the thin glass ribbon 1 at the impingement point 70 of the laser beam 7 while the thin glass ribbon 1 is advanced below the beam in the longitudinal direction 100. The laser beam 7 draws a track 71 running in the longitudinal extension direction 100 of the thin glass ribbon 1 and causes propagation of a stress crack 15 that is separating the glass ribbon 1 in the longitudinal direction 100 along the track 71 of the laser beam 7 due to the local heating.

The transport device 5, which is configured as a roller conveyor in the example of FIG. 7, generally comprises a roller arrangement 180, and, according to one implementation of the invention, a respective one directly upstream and downstream of the levitation support 3, as in the illustrated example. A roller arrangement 180 comprises a conveying roller 182 for advancing the thin glass ribbon 1, and a counter roller 184 counter-rotating and arranged opposed to the conveying roller 182, for pressing the thin glass ribbon 1 onto the conveying roller 182. The thin glass ribbon 1 is advanced by being passed through the roller arrangement 180, in other words between the conveying roller 182 and the counter-roller 184 along the longitudinal extension direction 100 thereof, preferably without slipping.

Accordingly, the thin glass ribbon is introduced into the apparatus at an inlet thereof by a roller arrangement 180 and is guided through the apparatus, which provides for reliable guidance of the glass ribbon and permits to minimize unwanted lateral deflection as well as vibrations.

Optionally, a cooling jet generator 14 may blow a cooling fluid onto the track 71 heated by the laser beam 7. Thereby the zone heated by the laser beam 7 is cooled down and an additional mechanical stress is produced, which causes propagation of a stress crack 15 separating the glass ribbon 1 along the longitudinal extension direction 100 thereof along the track 71 of laser beam 7, like in the embodiment of FIG. 1.

The conveying roller 182 of a roller arrangement 180 is preferably connected to a drive, such as a motor, while a counter roller 184 does not necessarily need a drive. The counter roller 184 primarily ensures a contact pressure for the thin glass ribbon 1 in order to provide sufficient friction for the advancement.

As illustrated in simplified manner in FIG. 7, two counter rollers 184 may be provided, a respective one rolling at each edge portion of the thin glass ribbon 1. Such peripheral counter rollers 184 prevent the thin glass ribbon 1 from becoming scratched in the area between the counter rollers 184, i.e. in the quality glass portion. Furthermore, drift control may optionally be provided by exerting a differential contact pressure by the counter rollers 184. In this way, the thin glass ribbon 1 can optionally be guided in controlled manner.

Conveying rollers 182 of the roller assemblies 180 upstream and downstream of levitation support 3 may have a linked drive so as to ensure synchronous advancement.

On the other hand, a tensile stress that is effective within the range of levitation support 3 may be exerted on the thin glass ribbon 1 along the longitudinal extension direction 100 thereof by the roller arrangements 180 arranged on either end of levitation support 3. For this purpose, it may be provided to set a different advancement rate as caused by the conveying rollers.

FIG. 8 shows another example of an apparatus 2 for cutting a thin glass ribbon 1 along its longitudinal extension direction 100, in the present case for severing edge portions, such as beads 10, 11, from a thin glass ribbon 1. The method which can be performed with the apparatus 2 for cutting a thin glass ribbon 1 along its longitudinal extension direction 100, in the present case for severing edge portions, such as beads 10, 11 from a thin glass ribbon 1 is performed on the basis that a thin glass ribbon 1 having a thickness of at most 400 µm is guided by a transport device 5 along its longitudinal extension direction 100 over a levitation support 3. A laser beam 7 is directed onto the thin glass ribbon 100 within the range of the levitation support, which laser beam heats up the thin glass ribbon 1 at the impingement point 70 of the laser beam 7 while the thin glass ribbon 1 is advanced below the beam in the longitudinal direction 100. Thereby the laser beam 7 draws a track 71 running in the longitudinal extension direction 100 of the thin glass ribbon 1, and causes propagation of a stress crack 15 that is separating the glass ribbon 1 in the longitudinal direction 100 along the track 71 of the laser beam 7 due to the local heating. Optionally, a cooling jet generator 14 may blow a cooling fluid onto the track 71 heated by the laser beam 7, so that the zone heated by the laser beam 7 is cooled down and a mechanical stress is produced which causes propagation of a stress crack 15 separating the glass ribbon 1 along the longitudinal extension direction 100 thereof along the track 71 of laser beam 7.

The apparatus 2 shown in FIG. 8 includes a blower device 190, as opposed to the levitation support 3, which blower device 190 blows a gas stream onto the upper surface 101 of thin glass ribbon 1. As a result, transversal waves propagating over the thin glass ribbon 1, which may be caused by the breaking of the beads 10, 11, mechanical impacts, or conveyor vibrations, for example, and which are propagating over the thin glass ribbon 1, can be damped. This solution may be provided alternatively or in addition to the embodiment according to FIG. 7 in order to improve the stability of the ribbon.

While blower device 190 blows a gas stream onto the upper surface 101 of the thin glass ribbon 1, levitation support 3 blows a gas stream onto the lower surface 102 of the thin glass ribbon 1, so that a gas cushion is provided on both sides. Thus, blower device 190 and levitation support 3 form a pneumatic damper for the thin glass ribbon 1.

Blower device 190 is supplied with a compressed fluid, for example air, by a pressure source, such as a pump 33.

Like the levitation support 3, the blower device 190 may have a plurality of openings in a surface facing the thin glass ribbon 1. The compressed fluid escapes through openings in the surface facing the thin glass ribbon 1, so that a gas cushion is formed between thin glass ribbon 1 and the surface of blower device 190, which is effective as a damper for the thin glass ribbon 1. As to the pump 33 or alternative sources of compressed air, the same applies as mentioned above with respect to levitation support 3. The levitation support 3 and the blower device 190 may be connected to the same pump or source of compressed air. The volume flow of blower device 190 may therefore correspond to that of levitation support 3, optionally after deduction of a fraction corresponding to the weight of the glass.

Referring to FIG. 9, an apparatus 2 for cutting a thin glass ribbon 1, includes roller arrangements 180 upstream and downstream of levitation support 3 and a blower device 190 arranged opposed to levitation support 3. In the example shown in FIG. 9, when leaving the roller arrangement 180 downstream of levitation support 3, i.e. after the separation process, the thin glass ribbon 1 is guided so as to form a slack 195, for isolation purposes, and is then wound onto a roll 200.

Furthermore, especially for separating thin glasses, certain beam footprints prove to be favorable in order to produce a temperature gradient between the upper surface 101 and the lower surface 102. Such a temperature gradient may be advantageous in order to achieve high directional stability in crack propagation.

For this purpose, according to a further embodiment of the invention without restriction to the use of a cooling jet, there is generally provided a method for cutting thin glass, in particular a thin glass ribbon 1 having a thickness of less than 400 µm, for example less than 250 µm, according to which the thin glass is progressively heated by a laser beam 7 along an advancement direction, namely the longitudinal direction 100, along a track 71 defining a separation line. Thereby, mechanical stress is produced in the glass due to the so produced temperature difference of the heated glass relative to the surrounding glass, and a crack in the form of a stress crack 15 is propagating along the separation line following the mechanical stress and severing the thin glass. The laser beam 7 is shaped in a manner, for example using beam forming optics, so that a beam footprint 73 thereof has an elongated shape, and wherein the laser beam 7 is directed onto the surface of the thin glass in a manner so that the longitudinal extension direction 74 of the beam footprint 73 is aligned in the advancement direction. The elongated shape of the beam footprint is asymmetric so that the intensity profile at the ends 75, 76 of the beam footprint 73 differs such that an increase in intensity is steeper at the leading end 75 first sweeping over the thin glass than the decrease in intensity at the opposite, trailing end 76.

Figure 10:
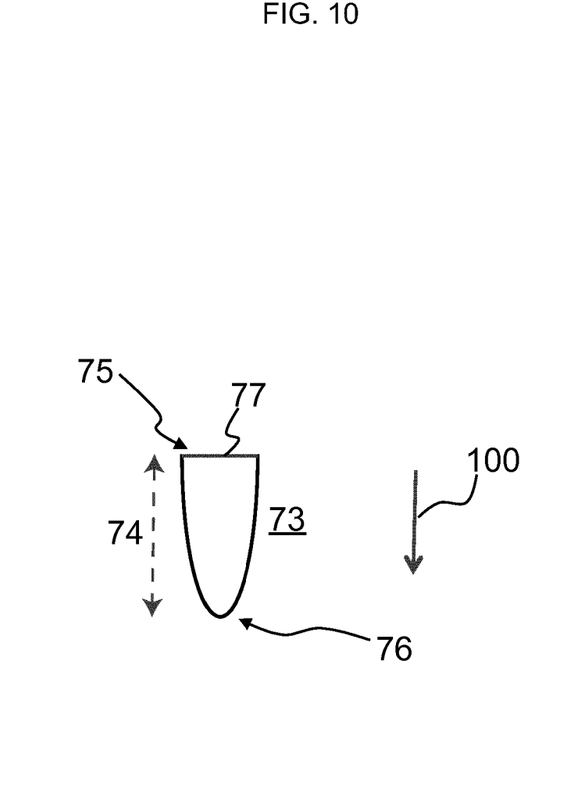
FIG. 10 shows an asymmetric beam footprint.

FIG. 10 shows, by way of example, a beam footprint 73 as described above together with the longitudinal extension direction 100 of thin glass ribbon 1. The elongated shape of the beam footprint is asymmetric, with different ends 75, 76 of the beam footprint, the leading end 75 which during advancement will sweep first over the glass being defined by an edge 77 extending perpendicularly to the advancement direction 100. Furthermore, the trailing end 76 of the beam footprint 73 exhibits a steadily decreasing intensity towards the end. Thus, the beam footprint moreover has a shape converging towards the trailing end 76. For example, the beam footprint 73 may converge in elliptical or pointedly tapering manner towards the end 76.

The use of such an asymmetric beam footprint increases process stability and thus also the strength and well-defined extension of the so produced glass edges. The shape of the footprint may easily be produced by masking or shadowing one end of the laser spot, for example.

Furthermore, the beam footprint and hence the temperature profile may be shaped in a manner so as to achieve control of the crack propagation such that the crack consistently follows the advancement direction and does not deviate laterally. This also proves to be difficult especially in the case of thin glasses, since the stress gradient that can be produced by the heating will anyway be smaller than in the case of thick glasses.

For this purpose, a method according to a further embodiment of the invention is provided for cutting thin glass, in particular a thin glass ribbon 1 having a thickness of less than 400 μm, for example a thickness in a range from 5 μm to 150 μm, in which the thin glass is progressively heated along a track 71 defining a separation line 203. The heating of the glass is accomplished by the energy of at least one energy source within an exposure field 204 of this energy source, for example by the energy of at least one laser beam 7 within the laser spot of this laser beam 7 on the thin glass. The exposure field 204 is moved over the thin glass along the separation line 203 so that a mechanical stress is produced in the glass due to the temperature gradient of the glass heated by the at least one energy source relative to the surrounding glass, which causes a crack in the form of a stress crack 15 to propagate along the separation line 203 following the mechanical stress. Two portions of the exposure field 204 are laterally spaced from the separation line 203 such as to frame a cutout 214 in the exposure field 204 through which the separation line 203 extends, in such a manner that within the area of this spacing, portions of the thin glass adjacent to but apart from the separation line 203 are heated more strongly than portions on the separation line 203. The exposure field 204 is shaped so that as the thin glass moves along the separation line 203, these portions converge in the advancement direction of the thin glass and meet on the separation line 203.

The method described above can be adapted so that the thin glass is progressively heated along a track 71 defining a separation line 203, and the heating of the glass is accomplished by two energy sources, for example two laser beams, each one impinging on the glass in a respective impingement area 211, 212. The exposure field 204 is defined by at least the first and second impingement areas 211, 212, and wherein the energy sources are directed onto the glass in such a manner that the impingement areas 211, 212 are offset laterally relative to one another in the direction perpendicular to the separation line, with the impingement areas 211, 212 overlapping in an overlapping area 213 so that the separation line 203 passes through this overlapping area 213. A mechanical stress is generated in the glass due to the temperature difference of the glass heated by the energy sources relative to the surrounding glass, in particular relative to the glass entering the overlapping area along the separation line 203, which causes a crack in the form of a stress crack 15 to propagate along the separation line 203 following the mechanical stress.

Figure 11A:
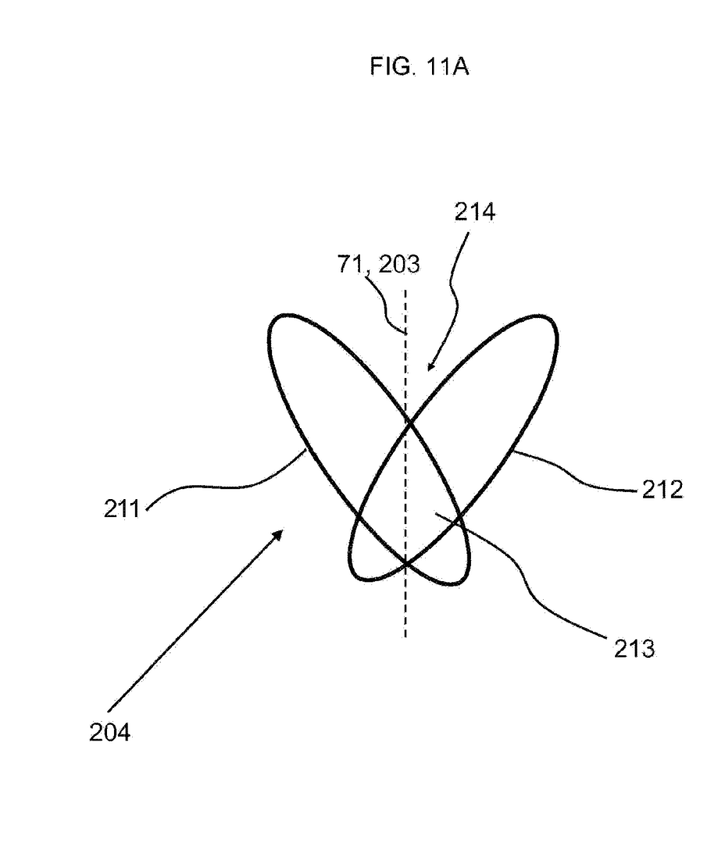
FIGS. 11A and 11B show shapes of exposure fields according to an embodiment of the present invention.

FIG. 11A generally shows two impingement areas 211, 212 which together define an exposure area or exposure zone 204. Due to the inclined alignment of the two impingement areas 211, 212 relative to one another, there is a cutout 214 between these two areas. Impingement areas 211, 212 overlap each other in an overlapping area 213. Accordingly, highest energy density is achieved in this area. Now, when the glass passes through this overlapping area 213, a very steep rise in temperature is caused compared to cold glass entering the overlapping area along separation line 203. Accordingly, a high stress gradient is caused there, and the crack is caused to propagate. The two non-overlapping areas of the impingement areas now ensure stable guidance of the crack. Upon a deviation of the course from the separation line, the temperature and hence the stress gradient decreases as a result of the likewise existing heating of the glass in these areas.

Figure 11B:
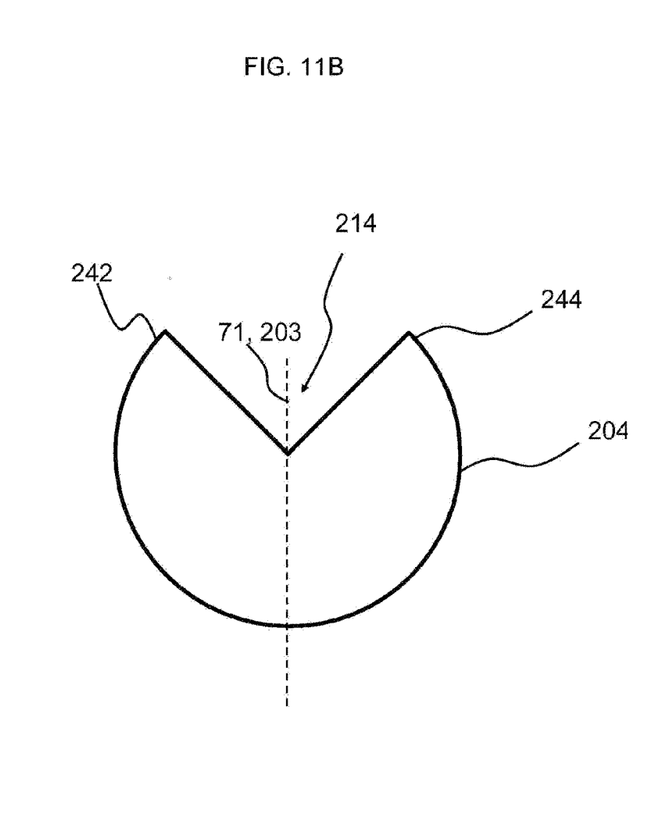

A portion of the exposure field 204 can be masked by a masking device (not shown here), thereby defining the cutout 214. FIG. 11B shows, by way of example, an exposure field 204 with its front end V-shaped cutout 214 facing in advancement direction and separating two portions 242, 244 of the exposure field 204 so that they are spaced from each other transversely to the separation line 203, with the mutually facing edges of the portions converging towards each other and meeting at the intersection of separation line 203 and exposure field 204. Such an exposure field 204 may as well be produced using a single energy source, for example by masking, as mentioned before. The energy source may for instance be a laser beam, and a portion of the laser spot defining the impingement area is masked out to define the cutout 214.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for cutting a thin glass ribbon having a thickness of at most 400 μm along a longitudinal extension direction of the thin glass ribbon, for severing beads on edge portions of the thin glass ribbon, the method comprising the steps of:

guiding, by a transport device, the thin glass ribbon along the longitudinal extension direction thereof over a levitation support;

directing, within a range of the levitation support, a laser beam onto the thin glass ribbon, which heats up the thin glass ribbon at an impingement point of the laser beam, and moving the thin glass ribbon in the longitudinal extension direction below the laser beam so that the laser beam draws a track running in the longitudinal extension direction of the thin glass ribbon; and spraying, by a cooling jet generator configured as an ink-jet printing head, a cooling fluid in the form of sequentially deposited, separated, and isolated liquid droplets onto the track heated by the laser beam so that a region heated by the laser beam is cooled down and a mechanical stress is created which causes propagation of a stress crack separating the glass ribbon in the longitudinal direction along the track of the laser beam, wherein each said liquid droplet forms a contact angle on a surface of the thin glass ribbon, which is smaller than that of water on the same surface, such that said beads are separated from the thin glass ribbon to improve a quality and a strength of the edge portions of the thin glass ribbon, and wherein the thin glass ribbon is guided so that a difference between mechanical stresses that are effective on an upper surface of said thin glass ribbon and on a lower surface of the thin glass ribbon in the longitudinal extension direction of the thin glass ribbon is less than 0.25 MPa.

2. The method according to claim 1, wherein, by way of a scoring device, an initial defect is introduced at a leading end of the thin glass ribbon prior to an impingement of the laser beam, which defect intersects said point of impingement of the laser beam so as to initiate the stress crack.

3. The method according to claim 2, wherein once the stress crack has been initiated, the scoring device is removed from the surface of the thin glass ribbon during a crack propagation, thereby terminating a scoring of the scoring device.

4. The method according to claim 3, wherein the scoring device comprises a scoring wheel, wherein a contact pressure of the scoring wheel when introducing the initial defect is less than 4 N.

5. The method according to claim 1, wherein said thin glass ribbon has a length of at least 10 meters in the longitudinal extension direction of the thin glass ribbon.

6. The method according to claim 1, wherein a fluid is supplied to the levitation support, which fluid is at a pressure in a range from 0.1 to 4 bar.

7. The method according to claim 1, wherein the transport device exerts a tensile stress on the thin glass ribbon, at least within the range of the levitation support, which tensile stress is effective in the longitudinal extension direction.

8. The method according to claim 1, wherein within the range of the levitation support, a tensile stress in a range from 0.5 MPa to 10 MPa is applied to the thin glass ribbon in the longitudinal extension direction.

9. The method according to claim 1, wherein the thin glass ribbon is advanced along its longitudinal extension direction passing between a roller arrangement.

10. The method according to claim 1, wherein the thin glass ribbon is advanced along the longitudinal extension direction thereof between a pair of roller arrangements on either side of the levitation support, in a manner so that a tensile stress effective within the range of the levitation support is exerted on the thin glass ribbon in the longitudinal extension direction thereof.

11. The method according to claim 1, wherein a gas flow is blown onto an upper surface of the thin glass ribbon within the range of the levitation support, so as to attenuate at least one transversal wave propagating across the thin glass ribbon.

12. The method according to claim 1, wherein said cooling fluid which is sprayed comprises liquid droplets containing at least one of:
water including surfactants, and
at least one of a monohydric alcohol, a polyhydric alcohol, and an ethylene glycol.

13. The method according to claim 1, wherein said cooling fluid is sprayed onto the surface of said thin glass ribbon, said cooling fluid comprises liquid droplets that form a contact angle of less than 40° on the surface of the thin glass ribbon.

14. The method according to claim 1, wherein a tensile force is exerted on the thin glass ribbon in the longitudinal direction, wherein within the range of the levitation support a ratio $\Delta\sigma/\sigma$ is less than 0.5, wherein $\Delta\sigma$ is a difference of the tensile stresses acting in the longitudinal extension direction on an upper surface and on a lower surface of said thin glass ribbon, and $\sigma$ is the tensile stress created by the tensile force applied in the longitudinal extension direction.

15. The method according to claim 1, wherein by virtue of a bulging of the thin glass ribbon at the point of impingement of the laser beam, a tensile stress is exerted perpendicularly to the longitudinal extension direction of the thin glass ribbon so that a ratio $\sigma/\alpha$ of tensile stress $\sigma$ to a coefficient of linear thermal expansion $\alpha$ is at least $0.07*10^{-6}$ MPa*$K^{-1}$.

16. The method according to claim 1, wherein a temperature difference $\Delta T$ which is achieved by the heating by way of the laser beam and the cooling by way of the cooling fluid assumes at least a value of $\Delta T = (7 \cdot K_{Ic})/(5 \cdot \alpha^{1/2} \cdot CTE \cdot E)$, wherein a parameter $K_{Ic}$ designates a fracture toughness, a parameter designates a critical crack length, a factor CTE designates a coefficient of linear thermal expansion, and E represents a Young's modulus of the glass.

17. The method according to claim 1, wherein the laser beam is shaped so that a footprint of the laser beam has an elongated shape, and wherein the laser beam is directed onto the surface of the thin glass so that a longitudinal extension direction of said footprint of the laser beam is aligned in an advancement direction, and wherein the elongated shape of the beam footprint is asymmetric so as to exhibit different intensity profiles at the ends of the beam footprint in a manner so that an increase in intensity at a leading end that is first sweeping over the thin glass ribbon is steeper than a decrease in intensity at the opposite, trailing end.

18. An apparatus for cutting a thin glass ribbon having a thickness of at most 400 μm along a longitudinal extension direction of the thin glass ribbon, for severing beads on edge portions of the thin glass ribbon, said apparatus comprising:
a levitation support;
a transport device for guiding the thin glass ribbon along the longitudinal extension direction thereof over the levitation support;
a laser for directing a laser beam onto the thin glass ribbon within a range of a levitation support and for heating up the thin glass ribbon at an impingement point of the laser beam so that the laser beam draws a track running in the longitudinal extension direction of the thin glass ribbon when the thin glass ribbon is moved by the transport device below the laser beam in the longitudinal direction;
a cooling jet generator configured as an ink-jet printing head for spraying a cooling fluid in the form of sequentially deposited, separated, and isolated liquid droplets onto the track that is heated by the laser beam so that a region heated by the laser beam is cooled down and a mechanical stress is created which causes propagation of a stress crack separating the glass ribbon in the longitudinal extension direction along the track of the laser beam; and
at least one liquid reservoir containing a liquid that is intended for producing the cooling fluid which contains said liquid droplets, wherein said liquid droplets form a contact angle on a surface of the thin glass ribbon, which is smaller than that of water on the same surface, such that said beads are separated from the thin glass ribbon to improve a quality and a strength of the edge portions of the thin glass ribbon, and wherein the thin glass ribbon is guided so that a difference between mechanical stresses that are effective on an upper surface of said thin glass ribbon and on a lower surface of the thin glass ribbon in the longitudinal extension direction of the thin glass ribbon is less than 0.25 MPa.

19. The apparatus according to claim 18, wherein the levitation support has a flat surface or a surface with a curvature axis having a component along the longitudinal extension direction of the thin glass ribbon.

20. The apparatus according to claim 18, wherein the transport device comprises a roller arrangement, the roller arrangement includes at least one conveying roller for advancing the thin glass ribbon and at least one counter roller counter-rotating and arranged opposed to the conveying roller, for pressing the thin glass ribbon onto the conveying roller so as to advance the thin glass ribbon between the conveying roller and the counter roller along the longitudinal extension direction of the thin glass ribbon.

21. The apparatus according to claim 18, wherein the transport device comprises a pair of roller arrangements on both sides of the levitation support, in order to exert a tensile stress on the thin glass ribbon in the longitudinal extension direction thereof, which is effective within the range of the levitation support.

22. The apparatus according to claim 18, further including a blower device arranged opposed to the levitation support, wherein the blower device blows a gas stream onto the upper surface of the thin glass ribbon, so as to attenuate at least one transversal wave propagating across the thin glass ribbon.

* * * * *

UNITED STATES PATENT AND TRADEMARK OFFICE
CERTIFICATE OF CORRECTION

PATENT NO. : 10,407,336 B2
APPLICATION NO. : 15/686514
DATED : September 10, 2019
INVENTOR(S) : Rossmeier et al.

Page 1 of 1

It is certified that error appears in the above-identified patent and that said Letters Patent is hereby corrected as shown below:

In the Claims

Column 16
At Line 3, In Claim 15, please delete "σto", and substitute therefore --σ to--.

Signed and Sealed this
Twenty-seventh Day of October, 2020

Andrei Iancu
*Director of the United States Patent and Trademark Office*